US007323131B2

(12) United States Patent
Lutze et al.

(10) Patent No.: US 7,323,131 B2
(45) Date of Patent: Jan. 29, 2008

(54) METHOD FOR APPLYING A PRE-WEAKENED LINE TO AN INTERIOR-TRIM PART IN A VEHICLE BY MEANS OF A LASER, SAID PART BEING PROVIDED WITH A DECORATIVE LEATHER LAYER

(75) Inventors: Walter Lutze, Jena-Drackendorf (DE); Martin Griebel, Jena (DE); Norbert Preuss, Jena (DE); Frank Steinhaeuser, deceased, late of Magdala (DE); by Vera Steinhaeuser, legal representative, Magdala (DE)

(73) Assignee: JENOPTIK Automatisierungstechnik GmbH, Jena (DE)

(*) Notice: Subject to any disclaimer, the term of this patent is extended or adjusted under 35 U.S.C. 154(b) by 0 days.

(21) Appl. No.: 10/578,345

(22) PCT Filed: Nov. 5, 2004

(86) PCT No.: PCT/DE2004/002479

§ 371 (c)(1),
(2), (4) Date: May 5, 2006

(87) PCT Pub. No.: WO2005/049261

PCT Pub. Date: Jun. 2, 2005

(65) Prior Publication Data

US 2007/0113968 A1  May 24, 2007

(30) Foreign Application Priority Data

Nov. 7, 2003 (DE) .............................. 103 52 524

(51) Int. Cl.
*B23K 26/38* (2006.01)
(52) U.S. Cl. ................ 264/482; 219/121.71; 280/728.3
(58) Field of Classification Search ........... 219/121.69, 219/121.71; 280/728.3; 427/289; 156/272.8, 156/252, 253; 264/400, 482
See application file for complete search history.

(56) References Cited

U.S. PATENT DOCUMENTS 3,930,921 A * 1/1976 Connett ...................... 156/234

(Continued)

FOREIGN PATENT DOCUMENTS

| DE | 195 40 563 | 5/1997 |
|----|------------|--------|
| DE | 694 04 269 | 6/1997 |

(Continued)

OTHER PUBLICATIONS

Patent Abstracts of Japan: Publication No. 2001-138081 published May 22, 2001, Kiysohi Kawai, (Application No. 11-329593 filed Nov. 19, 1999) Laser Cutter and Automatic Embroidery Machine.

*Primary Examiner*—Geoffrey S. Evans
(74) *Attorney, Agent, or Firm*—Reed Smith LLP

(57) ABSTRACT

A method for producing an interior trim part in a vehicle having a decorative layer of leather, wherein the fiber structure of the leather is fixed by undercooling or by a fixing agent at least along a desired weakened line before the weakened line is produced by a laser and for the duration of the laser treatment. The leather comprises a dermis having an underside and a top skin having a decorative side. The weakened line is preferably formed by a series of perforations.

14 Claims, 1 Drawing Sheet

U.S. PATENT DOCUMENTS

| | | |
|---|---|---|
| 5,611,564 A | 3/1997 | Bauer |
| 5,743,408 A * | 4/1998 | Hill .............................. 206/575 |
| 6,453,535 B1 * | 9/2002 | Nicholas ................... 280/728.3 |
| 6,808,197 B2 * | 10/2004 | Bauer et al. .............. 280/728.3 |
| 2004/0164531 A1 * | 8/2004 | Riha et al. ................ 280/728.3 |

FOREIGN PATENT DOCUMENTS

| | | |
|---|---|---|
| DE | 196 36 429 | 11/1997 |
| DE | 196 36 428 | 3/1998 |
| EP | 0 711 627 | 5/1997 |

* cited by examiner

METHOD FOR APPLYING A PRE-WEAKENED LINE TO AN INTERIOR-TRIM PART IN A VEHICLE BY MEANS OF A LASER, SAID PART BEING PROVIDED WITH A DECORATIVE LEATHER LAYER

CROSS-REFERENCE TO RELATED APPLICATIONS

This application claims priority of International Application No. PCT/DE2004/002479, filed Nov. 5, 2004 and German Application No. 103 52 524.6, filed Nov. 7, 2003, the complete disclosures of which are hereby incorporated by reference.

BACKGROUND OF THE INVENTION a) Field of the Invention

In modern high-quality motor vehicles, cushioned vehicle outfitting such as seat cushions, backrests, headrests, and armrests are covered with automobile leather (leather). Also, rigid interior trim parts in vehicles such as dashboard panels, consoles, steering wheel caps, sun visors, and interior trim on doors are made with a decorative leather layer facing the passenger compartment.

b) Description of the Related Art

In order to apply the leather tightly over the edges of these parts of the vehicle interior (bend lines), or also so that it has a lower tear strength along a predetermined rupture line provided in the interior trim of the vehicle, e.g., in an airbag cover, the leather is weakened or severed along the desired bend line or predetermined rupture line and then sewed together again with functional thread. This functional thread is often undesirable for design reasons.

In practice, the leather is weakened by cutting or peeling with a knife from the underside.

Leather is a general term for tanned hides whose original fiber structure is retained substantially intact. Excluding splits or parts of the skin that were removed prior to tanning and are not used as automobile leather on principle, the leather comprises a grain layer, or top skin, and a dermis. Although it makes up only a fraction of the total thickness of the leather, the top skin substantially determines the tear strength.

Because of variations in thickness of the leather and the relatively small thickness of the top skin, the cutting depth when cutting by means of knives is selected in such a way that the top skin remains undamaged. This has the disadvantage that the tear strength of the leather is reduced only by about half even when the dermis is completely severed. Further, there is a wide variation in tear strength as a result of the natural variations in thickness of the undamaged top skin.

Generally, the requirements with respect to low, reproducible and defined tear strength, in particular for a predetermined rupture line in an airbag cover, are very demanding and are not met by mechanical cutting.

Cutting has virtually no effect for bend lines when the two adjoining outer surfaces enclose an angle of 180° because the leather is then pushed together in the area of the underside and causes the top side to curl up. Obviously, this disadvantage can be overcome when material is removed rather than merely severed along the predetermined bend line.

The person skilled in the art knows in particular from the multitude of publications concerning methods for producing integrated airbag covers in an interior trim part in a vehicle that removal of material for purposes of weakening along a line can be achieved by a laser.

The object of the known methods basically consists in controlling or regulating the removal of material in such a way that the surface of the interior trim part in the vehicle that is visible from the passenger compartment does not reveal the weakened line to the naked eye, and the tear strength along the weakened line is defined and is as small as possible. There are solutions in which grooves having a constant depth or constant residual wall thickness are generated, solutions in which rows of continuous or discontinuous perforations with a constant or varying depth or residual wall thickness form the predetermined rupture line, and solutions which combine grooves and perforations.

EP 0 711 627 A2 discusses the difficulties in generating weakened lines of the type mentioned above by different techniques. It is noted that the groove depth of the weakened line must be carefully controlled so that a reliable rupture of the outer cover layer (decorative layer) is caused at exactly the right time. On the one hand, the groove depth must not be too small so that the resistance to be overcome when opening is not too great; on the other hand, sufficient material should remain so that the weakened line is not extremely visible. It is also mentioned that in cover layers having an irregular inner surface the groove depth must be controlled in such a way that the remaining residual wall thickness is constant. In order to solve these problems, EP 0 711 627 A2 proposes cutting a continuous groove by means of a laser beam. The laser beam is controlled so as to achieve a constant thickness in the material remaining below the groove or a constant groove depth. To generate weakened lines with different opening resistance, the groove is generated with a different depth in a portion comprising a carrier layer, a foamed material layer and a decorative layer. At all of the depths that are mentioned by way of example, the carrier layer is completely severed and at least a portion of the foamed material layer is penetrated until the foamed material layer completely penetrates into the decorative layer. The residual wall thickness remaining below the groove cannot be minimized to an unlimited extent because otherwise the groove would become visible due to the residual material sinking into the groove. Insofar as the foamed material layer is retained at least in part as a supporting layer for the decorative layer, no weakening of the decorative layer can be carried out.

The basic idea of retaining the foamed material layer at least partially as a supporting layer for the decorative foil in the area of the weakened line while nevertheless weakening the decorative layer leads to the weakened line formed by pocket holes.

DE 196 36 429 C1 describes the advantages of a weakened line through removal of material in the form of pocket holes: Whereas only the residual wall thickness below the groove can be varied as a geometric quantity for influencing the opening resistance (tear strength) when creating a weakened line according to EP 0 711 627 A2, the web width between the pocket holes can also be effectively varied when pocket holes are arranged in a row (perforation line).

When material is removed in the shape of a groove, the residual material must be strong enough not to sink into the groove and so become visible. This sinking is prevented when pocket holes are arranged in a row, even with small residual wall thicknesses, due to the webs which remain between the pocket holes and act as supports. It is also possible to achieve a constant tear strength over the entire perforation line when the pocket holes have different residual wall thicknesses which repeat periodically.

Generating pocket holes of different residual wall thickness is based on the idea that small residual wall thicknesses and narrow webs can lead to high thermal stress which, similar to the relaxing of material caused by aging, leads to the residual material sinking into the pocket holes and thus rendering the weakened line visible. In order to prevent this, material is removed in a periodically alternating manner at different depths into the decorative layer. At smaller depths, appreciably greater web widths are retained in the foamed material layer, and there is less thermal stress on the decorative layer. The risk of visibility is prevented more reliably with only a small increase in tear resistance.

However, as practical tests have shown, the selected distance between the pocket holes penetrating the decorative layer must be very great in order that a web of foamed material is in fact retained. The radiation energy required for removing the carrier layer and decorative layer is so high that extensive portions of the foamed material layer are burnt around the pocket hole. However, as a result of the large distance between the pocket holes, particularly when stronger materials are used for the decorative layer, the required opening force is too great.

The solutions mentioned above represent a compromise between the lowest possible residual wall thickness and a small web width on the one hand, in order to achieve a low opening resistance of the weakened line, and a sufficiently large residual wall thickness and large web widths on the other hand, so that the weakened line is not visible to the passengers.

DE 195 40 563 A1 shows an instrument panel for motor vehicles which is covered by a foil and which has an integrated airbag flap. The foil (decorative layer) has a weakened line formed by a row of perforations which completely penetrate the material. The inventive idea in this solution consists in that the visibility of the weakened line is reduced by overlapping a laser-cut groove with the weakened line.

Also with the aim of generating a less visible weakened line, DE 196 36 428 A1 proposes generating a weakened line which alternates with the actual predetermined rupture line and which is similar to the surface structure of the decorative layer.

None of the solutions mentioned above is suitable for generating a predetermined rupture line that is invisible to the naked eye in a decorative layer comprising a natural leather, particularly an automobile leather or an interior trim part in a vehicle having such a decorative layer.

Tests have shown that the leather curls up visibly along the predetermined rupture line when acted upon by laser radiation. This effect can be explained by the burning produced by laser radiation and the resulting contraction of the collagen fibers due to thermal loading. While this curling can be virtually eliminated by subsequent smoothing processes, e.g., by rubbing, rolling, or brushing, this turns out to be difficult and not permanent, particularly when the leather is already bonded with the other material layers of the interior trim part in the vehicle.

U.S. Pat. No. 5,611,564 discloses an airbag cover with a decorative layer of leather and a method for treatment of a decorative layer of leather for an airbag cover. It is explained that airbag covers usually have a decorative layer of vinyl which is notched, and therefore weakened, along the tear line. Although leather would be desirable as a more luxurious alternative to vinyl for a decorative layer for an airbag cover, it cannot be used for this purpose because it is not susceptible to notching. Its soft, flexible quality is not suited for tearing in a controlled manner even when the leather is suitably scored. In order to overcome this problem, it is suggested that the leather is embrittled along the intended tear line by partial saturation with a hardening agent. Lacquer which becomes friable when hardened is mentioned as an example for the hardening agent. According to the invention, the hardened strip is notched and thus weakened through the reduced thickness and the notch sensitivity of the hardened leather strip.

Notch sensitivity is a technical term known to the applicant that is employed to denote the tendency of a material to develop cracks at notched locations, sharp edges, or abrupt transitions in wall thickness, that is, at locations with stress concentration.

In order to determine notch sensitivity, notch impact strength can be measured on a notched specimen. The higher the notch sensitivity, the lower the notch impact strength compared to impact strength (ISO 180). The impact strength is a measure of the capacity of the material to absorb impact energy and percussion force without breaking.

There appears to be no doubt that the term 'notch sensitivity' was employed in the sense described above in U.S. Pat. No. 5,611,564 which was applied for in 1993. It can be gathered from the description that by notching is meant cutting, wherein, for example, the cut penetrates to the center of the leather thickness. The drawing leads to the conclusion that peeling is also carried out in such a way that the material is not only severed but removed so that a groove is formed. Presumably, the method of notching should be a mechanical process. As is explained in U.S. Pat. No. 5,611,564, the notching is not sufficient to tear the leather along this notching.

In contrast to 1993, it is now state of the art to perforate weakened lines by lasers particularly also in airbag covers or in decorative layers for airbag covers. A perforation line comprising perforations that are invisible to the naked eye and completely, or almost completely, penetrate the leather and accordingly also the firm top layer of the leather weakens the leather along this line sufficiently to tear the leather by a defined, suitable force. In a weakened line generated in this way, there is no need to embrittle the leather along the weakened line.

However, as was already explained above, laser perforation cannot be used for leather in view of the required cosmetic result, i.e., that the weakened line remains permanently invisible on the visible side of the leather, because visible curling still occurs during the laser perforation.

OBJECT AND SUMMARY OF THE INVENTION

It is the primary object of the invention to produce a weakened line by means of a laser in a decorative layer of leather, particularly automobile leather or an interior trim part in a vehicle having such a decorative layer, which weakened line has a low defined tear strength and is invisible to the naked eye for passengers of the vehicle.

This object is met in a method for producing an interior trim part in a vehicle with a decorative layer of leather with an underside and a decorative side, wherein a weakened line is introduced from the underside by laser radiation comprising the further step of fixing the fiber structure of the leather at least along the desired weakened line prior to laser treatment and for the duration of laser treatment in order to prevent visible curling along the weakened line.

It is essential to the invention that the fiber structure of the leather (particularly comprising collage fibers) is fixed at least along the desired weakened line prior to laser treatment. This can be carried out by intensive undercooling or by applying a fixing agent. Since the method according to the invention is also applicable in an advantageous manner for split leather or buffed leather comprising only the dermis, the following description refers to the underside 3 and the decorative side 4 of the leather. Accordingly, in a leather comprising top skin 1 and dermis 2, the exposed surface of the dermis 2 is the underside 3 and the visible side of the top skin 1 is the decorative side 4. The fibers in the leather are fixed by undercooling or by applying a fixing agent to the underside 3 along the desired weakened line so that the leather remains unchanged outside of the immediate working zone of the laser and curling which would otherwise occur along the weakened line is consequently prevented. In order to retain the useful properties of the leather, fixing agents that do not cause chemical changes in the leather are preferably used. The fixing agents should either not substantially alter the flexibility of the leather, e.g., breathable coatings such as are used when dressing the leather, or their action should be reversible if they stiffen the leather.

The invention will be explained more fully in the following by means of a drawing with reference to an embodiment example.

DESCRIPTION OF THE PREFERRED EMBODIMENTS

Figure 1:
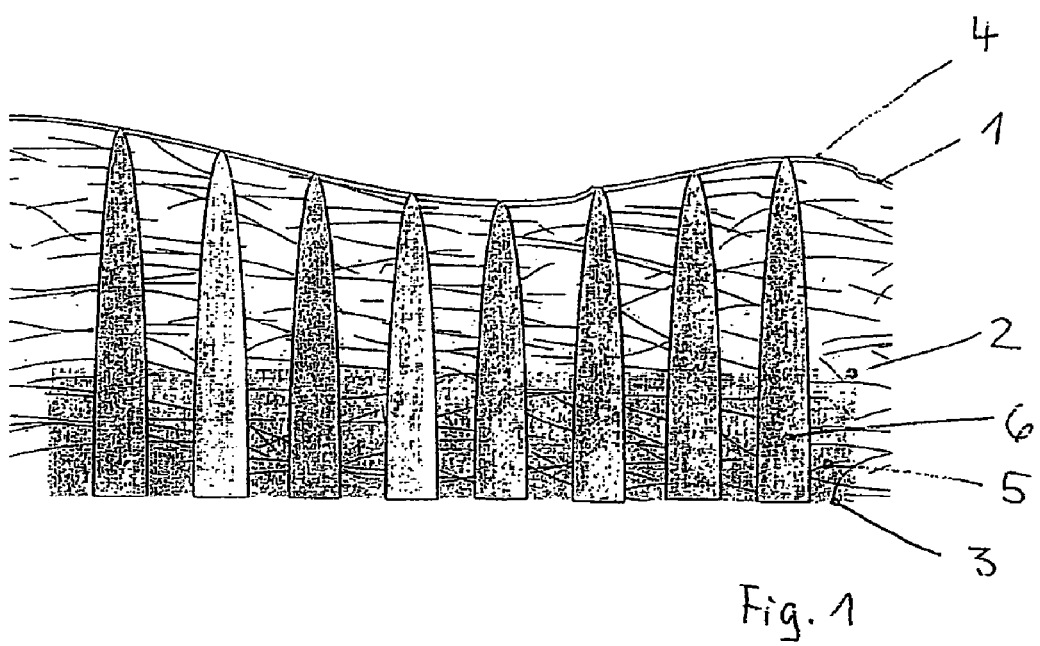
FIG. 1 shows a cross section through the machined leather.

In a first embodiment example, a weakened line is separately introduced in an individual leather layer. This can be advantageous, e.g., when a prefabricated dashboard panel provided with an exit opening for an airbag or an interior trim part in a vehicle with edges projecting into the passenger compartment is to be covered with leather.

The dressed leather is treated with a fixing agent before the actual cutting by laser radiation as is known in principle from the prior art. The fixing agent is preferably applied over the entire surface of the underside 3 of the leather by suitable methods, e.g., brushing on or spraying on, so that any perceptible changes in the leather will not have an effect on the homogeneous overall impression. In order to economize on fixing agent, it may also be applied only along the desired weakened line. Fixing agents whose effect is limited in time and which therefore do not influence the long-term properties of the leather are advantageous.

The desired effect is achieved even by applying a commercially available hair lacquer or hairspray. As has been shown, application of a fixing agent prior to laser cutting has a positive effect when processing not only leather but also other fibrous materials, e.g., nonwoven or formed fabric.

The fixing agent penetrates into the leather along the desired weakened line and, after binding, fixes the fibers in the leather so as to counteract a change in the fiber structure in the area surrounding the immediate working area of the laser radiation resulting from the introduction of heat. After a drying phase, such as that recommended by the manufacturer of the fixing agent being used, the actual laser treatment can begin. When using a commercially available hair lacquer, a drying phase of 2 to 15 minutes has proven sufficient.

FIG. 1 shows a cross section through a leather comprising the top skin 1 with a decorative side 4 and a dermis 2 with an underside 3. The fixing agent 5 that is applied to the underside 3 partially penetrates into the leather (illustrated by the dark area in the drawing). The weakened line which is introduced by laser radiation comprises a plurality of perforations 6.

In theory, all of the laser cutting processes mentioned in the introductory part of the specification are applicable after the pretreatment, according to the invention, along the desired weakened line without causing curling.

In practice, however, complete perforation has proven particularly advantageous. For this purpose, the laser parameters such as pulse duration and output are selected in accordance with forward feed speed in such a way that the diameter of the perforations 6 on the visible surface of the leather are so small that they are on the order of magnitude of the pores in the leather and are therefore not perceptible to the naked eye. It has been shown that material removal in the top skin 1 of the leather in particular leads to an appreciable reduction in tear strength. Conversely, material removal in the dermis only slightly reduces the tear strength along the weakened line. In contrast, it has been shown that removing as little material as possible in the dermis, and therefore a low thermal loading of the dermis, is advantageous as regards permanent invisibility of the weakened line.

Only a slight thermal loading and particularly small diameters of the perforations 6 are achieved when the cutting is carried out with short and ultra-short laser pulses at appropriate intervals. It has also been shown that the use of nitrogen as cutting gas at only a low pressure, e.g., 0.5 to 1 bar, counteracts curling of the leather and contributes to a reduction in the burn residues.

The tear strength along the predetermined rupture line and, therefore, the required tearing force is substantially determined by the spacing between the perforations 6 and the tear strength of the leather per se.

In addition to the low tear strength that can be achieved in the predetermined rupture line compared to a mechanically cut predetermined rupture line, the range of variation in the tear strength along the predetermined rupture line is also appreciably reduced. It responds to the demand for a defined tearing force.

As was already mentioned, the method according to the invention is suitable not only for generating predetermined rupture lines in leather but also for generating bend lines. This has to do not with the small defined tearing force, but rather with the removal of material from the dermis. The person skilled in the art knows how to select the process parameters in order, for example, to remove material at a continuous depth (to generate a groove).

The method according to the invention is also suitable for generating visible hole patterns in leather for purposes of conveying information or for decorative purposes. The process parameters are selected in such a way that clearly visible holes are formed in a predetermined pattern.

Instead of laser treatment of the leather immediately after the application of the fixing agent 5, the leather can also first be connected to other layers, which jointly form an interior trim part in a vehicle as is described, e.g., in EP 711 627, and can be subjected to laser treatment as a composite with these other layers. In this case, the first layers can be cut rapidly by a continuously operated laser, while ultra-short pulses are applied to the leather as was described.

It will be appreciated by the person skilled in the art that the rest of the layer construction and in particular the material of the layer communicating with the leather is not essential to the invention. For example, the leather can be applied directly to a plastic substrate forming, e.g., a steering wheel cap, a synthetic spacer textile, a foam layer, a textile layer, or a foil.

Beside spraying on or brushing on, the fixing agent can also penetrate into the leather when glued to the layer lying beneath it. For this purpose, a fixing agent is added to the glue and the glue is applied either to the leather or to the layer upon which the leather is arranged.

It is also possible to produce the glue connection between the leather and the layer lying beneath it by means of a two-component adhesive. One component is applied to the leather and the other component is applied to the layer lying beneath it, and a fixing agent which penetrates into the leather is released during the bonding of the components.

The fixing of the fiber structure can also be carried out by undercooling the leather immediately before laser treatment or by pre-shrinking the leather.

In each specific embodiment of the method, undercooling, pre-shrinkage or application of a fixing agent 5 prior to laser treatment prevents the leather from curling up during the laser treatment.

While the foregoing description and drawings represent the present invention, it will be obvious to those skilled in the art that various changes may be made therein without departing from the true spirit and scope of the present invention.

What is claimed is:

1. In a method for producing an interior trim part in a vehicle having a decorative layer of leather with an underside and a decorative side, wherein a weakened line is introduced from the underside by laser radiation, comprising the further step of:

fixing the fiber structure of the leather at least along the desired weakened line prior to laser treatment and for the duration of laser treatment in order to prevent visible curling along the weakened line wherein a fixing agent is applied over the entire surface of the underside of the leather and penetrates into the leather.

2. The method according to claim 1, wherein the fixing agent is a lacquer that is brushed on.

3. The method according to claim 1, wherein the fixing agent is a lacquer that is sprayed on.

4. The method according to claim 1, wherein the leather is connected to additional layers forming the interior trim part in the vehicle after applying the fixing agent and is treated by laser radiation as a composite.

5. The method according to claim 4, comprising that the fixing agent is added to a glue which is applied to the leather before the leather is connected to additional layers forming the interior trim part.

6. The method according to claim 4, comprising that the fixing agent is added to a glue which is applied to the layer of an interior trim part upon which the leather is arranged.

7. The method according to claim 1, wherein the leather is subjected to the laser treatment after applying the fixing agent and is subsequently applied to the interior trim part that is prefabricated in other respects.

8. The method according to claim 1, wherein the leather is undercooled at least along the desired weakened line immediately before the laser treatment.

9. The use of a method according to claim 8, comprising the step of using the weakened line is a predetermined rupture line defining the contour of an airbag opening in an interior trim part.

10. The use of a method according to claim 8, comprising the step of using the weakened line is a bend line.

11. The use of a method according to claim 8, comprising the step of using the weakened line forms a visible pattern of holes from the decorative side.

12. The use of a method according to claim 1, comprising the step of using the weakened line is a predetermined rupture line defining the contour of an airbag opening in an interior trim part.

13. The use of a method according to claim 1, comprising the step of using the weakened line is a bend line.

14. The use of a method according to claim 1, comprising the step of using the weakened line forms a visible pattern of holes from the decorative side.

* * * * *